May 24, 1938.  N. M. MARSILIUS  2,118,260
CRANKSHAFT MILLING MACHINE
Filed Oct. 3, 1936  8 Sheets-Sheet 1

Fig.1

INVENTOR
Newman M. Marsilius
BY
C. M. Newman  ATTORNEY

May 24, 1938.  N. M. MARSILIUS  2,118,260
CRANKSHAFT MILLING MACHINE
Filed Oct. 3, 1936   8 Sheets-Sheet 6

INVENTOR
Newman M. Marsilius
BY
C. M. Newman
ATTORNEY

May 24, 1938.   N. M. MARSILIUS   2,118,260
CRANKSHAFT MILLING MACHINE
Filed Oct. 3, 1936   8 Sheets-Sheet 8

Fig.11

INVENTOR
Newman M. Marsilius
BY  E. M. Newman
ATTORNEY

Patented May 24, 1938

2,118,260

UNITED STATES PATENT OFFICE 2,118,260

CRANKSHAFT MILLING MACHINE

Newman M. Marsilius, Bridgeport, Conn., assignor, by mesne assignments, to The Bridgeport Bronze Company, Bridgeport, Conn., a corporation of Connecticut Application October 3, 1936, Serial No. 103,831

11 Claims. (Cl. 90—15)

This invention relates to new and useful improvements in milling machines such for instance as are provided with several rotary milling units designed for simultaneously performing specific operations upon a single piece of work.

An object of the invention is to provide a simplified though durable type of milling machine adapted for performing several operations on a single piece of work such for instance as an automobile engine crank shaft. Further to provide a milling machine of the type designated wherein the several cutters are arranged at different angles with respect to each other, so as to perform longitudinal and cross milling operations.

Another feature of the invention is to provide a reciprocatory table carrying a head stock, a tail stock and oil pan for mounting the work piece; to provide spaced apart cutters mounted upon separate though aligned vertical spindles for performing similar milling operations upon opposite sides of a work piece, also to provide slide means whereby the several milling cutters are automatically fed to and from the work piece so that the several operations upon the said work piece may be quickly performed.

As will be apparent to those familiar with machine shop practice, it is first necessary for the finishing of a piece of work, to provide upon each like piece suitable centers, spots, or other forms of surface markings, to be gripped, so as to insure proper and similar engagement of the chucking tools of finishing machines for following operations. In most lathe work of this character the work pieces to be turned or milled are first provided with centers upon each end for the engagement of the points of the head stock and tail stock. In some classes of work, for instance an automobile crank shaft, such as are commonly made of steel forgings, and very irregular in shape, it is also necessary in addition to providing end centers to mill off sides of the cheeks of the cranks of the pieces so that same may be reduced to uniform size for chucking in other machines for additional milling and turning operations and whereby the same may be uniformly and accurately performed.

With the above and other objects in view the invention consists of the improved special type of multiple milling machine and its parts and combinations as set forth in the claims, and all equivalents thereof.

In the accompanying drawings in which the same reference characters indicate the same parts in all of the views.

Figure 1:
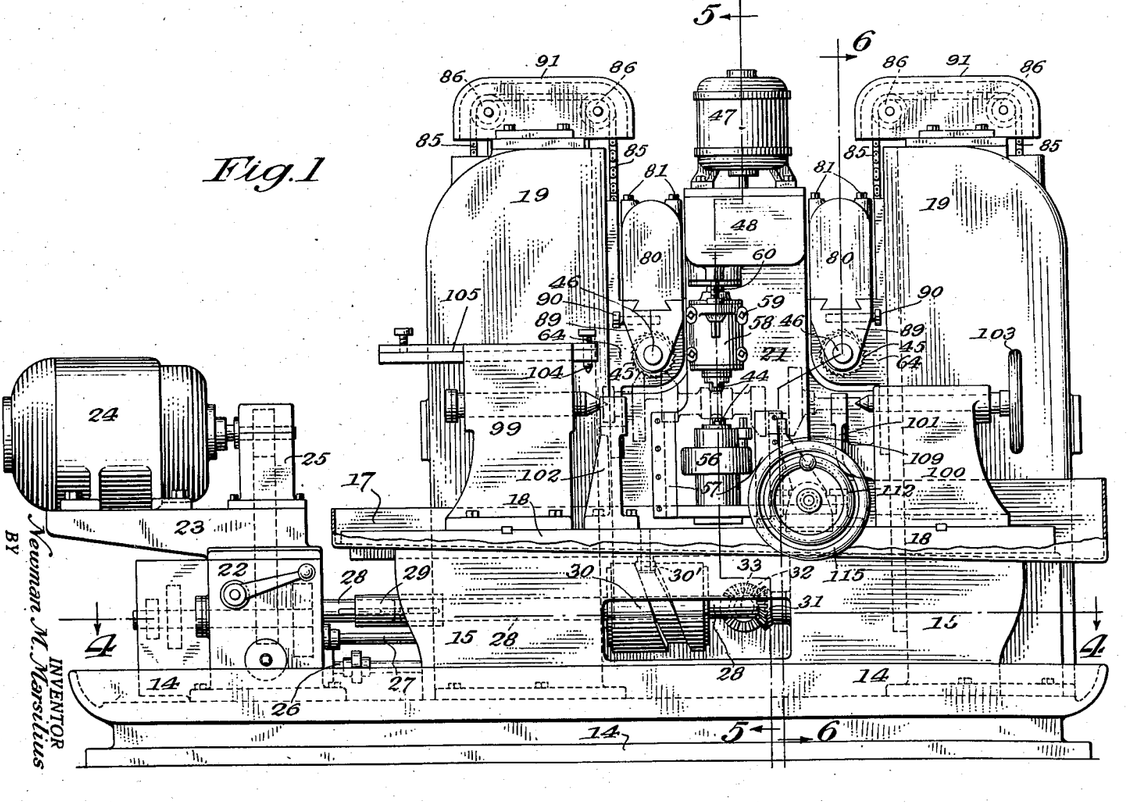
Fig. 1 shows a front elevation of a simplified form of my improved milling machine including its two electric motor drives, the oil and chip pan being broken away.
Figure 2:
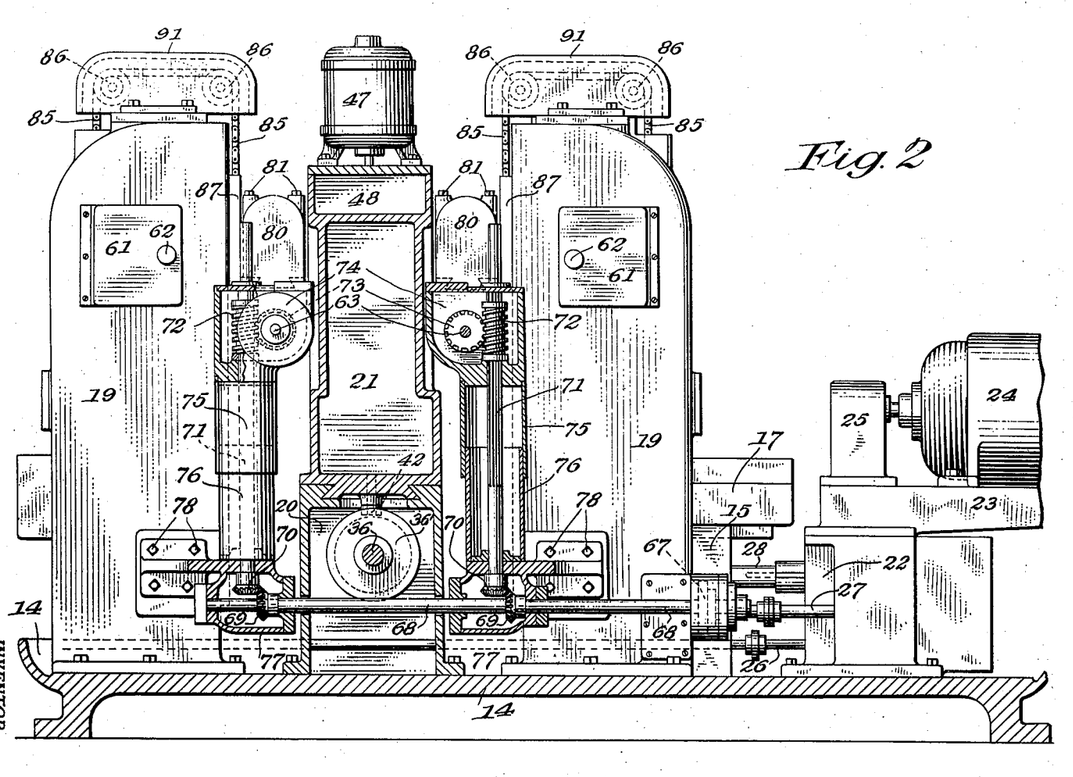
Fig. 2 shows a rear sectional elevation as seen from the opposite side of that shown in Fig. 1, one motor being broken away.
Figure 3:
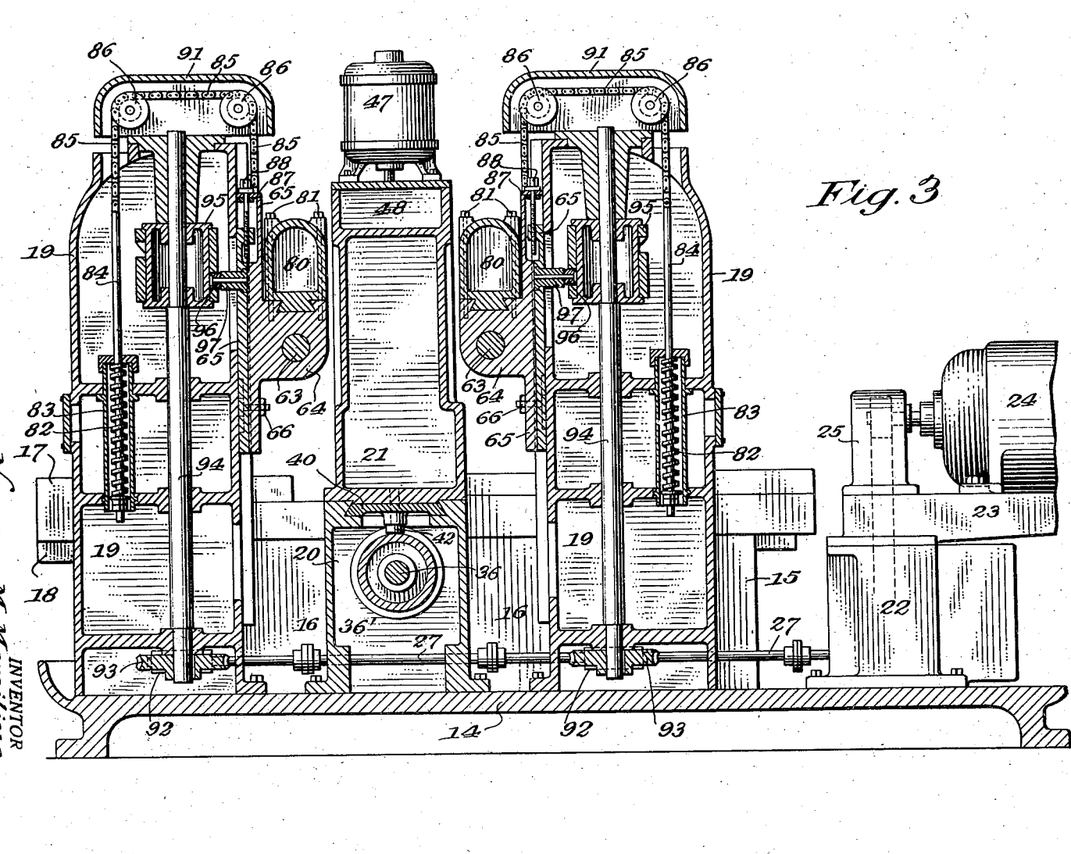
Fig. 3 shows a longitudinal sectional view taken on line 3—3 of Fig. 4 looking in the same forward direction as Fig. 2, more clearly illustrating the drive shafts and cams for operating the two vertically movable rotary cutters carrying slides.
Figure 4:
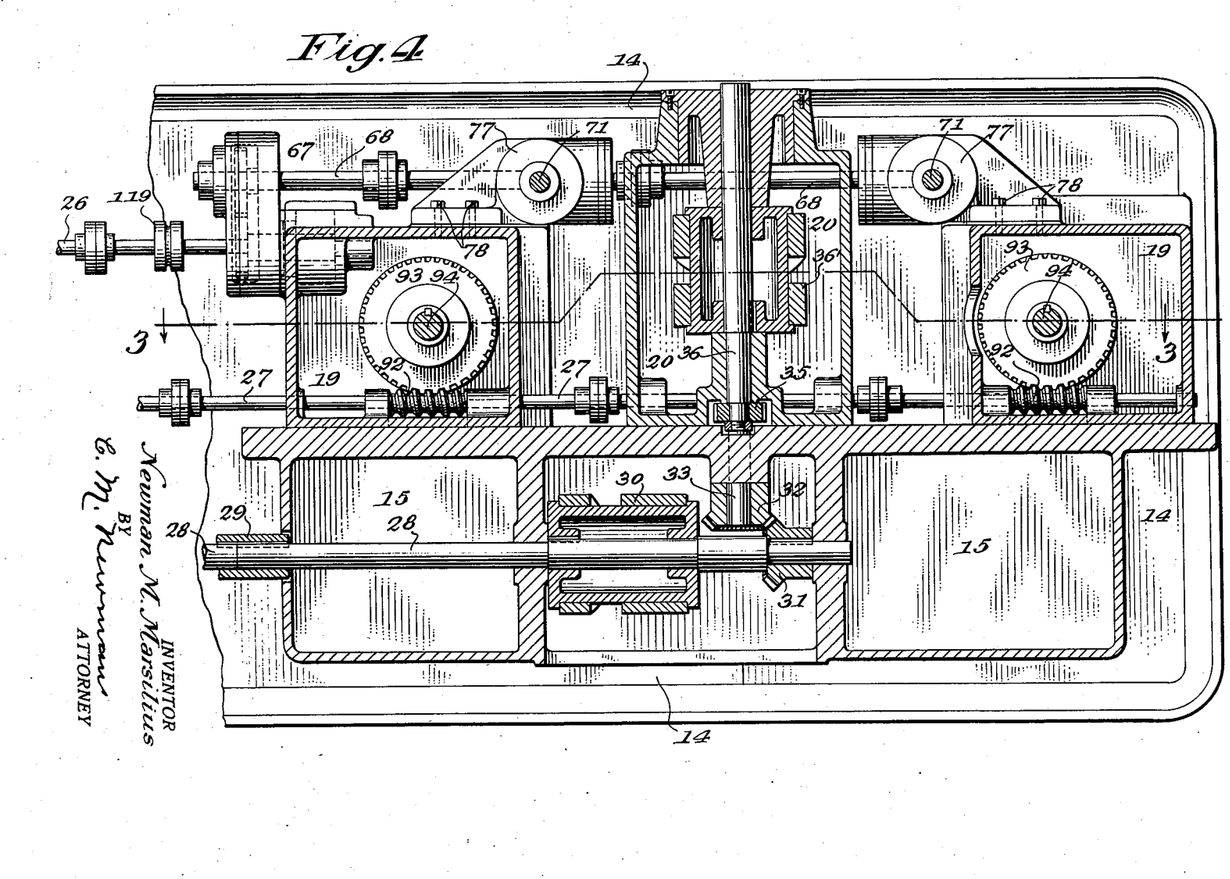
Fig. 4 shows a sectional plan view on an enlarged scale taken on line 4—4 of Fig. 1.

Referring in detail to the characters of reference marked upon the drawings, 14 indicates the base which is of an elongated shape in which the several parts of the machine are mounted. These parts include an elongated bed 15 having a longitudinal dovetail way 16 in its top surface to accommodate a reciprocatory work table 18, carrying an oil and chip pan 17. The base also supports two columns 19—19 which are alike in construction, design, and purpose, and are secured to the bed on opposite sides of an intermediate bed 20 for an intermediate cross slide 21. The bed further serves to support a gear housing 22 upon which a motor table 23, a motor 24, and a belt housing 25 are carried. The motor 24 provides most of the power utilized for the operation of the machine and as indicated in Fig. 1, is belted to drive the change gear train within the housing 22. Three different drive shafts 26, 27, and 28 are driven from the change gears and serve to operate the different trains of mechanisms in the machine. The shaft 28 which includes a coupling 29 extends longitudinally through the bed 15 and carries a cam 30 for reciprocating the before mentioned table 18, the said table being provided with a depending stud bearing a roller 30' for engagement with the cam groove and whereby the said table is moved longitudinally to properly feed the work piece to the several milling units. This shaft 28, see Figs. 1 and 4, also carries a bevel pinion 31 which meshes with and drives a similar bevel pinion 32 upon a short shaft 33 which has its bearing in the side wall of the bed 15 and is positioned at a right angle to the driving shaft 26. This short shaft 33 carries a small gear 34 that meshes with and drives a similar gear 35 mounted above the gear 34 and upon a cam shaft 36 journaled within bearings of the bed 20 for the intermediate cross slide 21 which carries the vertical cutter spindles 38 and 39. The slide, as will be seen from Fig. 3, is provided with an adjusting plate 40 that is adjustably secured to the under side of the slide by screws 41 and includes parallel bevel side edges corresponding with and for the purpose of engaging the dovetail ways in the top portion of the intermediate bed 20. This plate also carries a depending stud upon which a roller 42 is mounted for engagement with the groove of the cam 36'. By reason of the employment of a separate adjusting plate having beveled edges to engage the dovetails of the intermediate bed and the use of the screws 41 for securing said plate to the slide and the further employment of the micrometer adjusting screw 43 not only can a very secure connection be insured as between the plate and slide but also it is possible to obtain a very fine adjustment, which is clearly disclosed by the graduations shown on the collar of the screw 43.

Figures 6, 7, 8, 9:
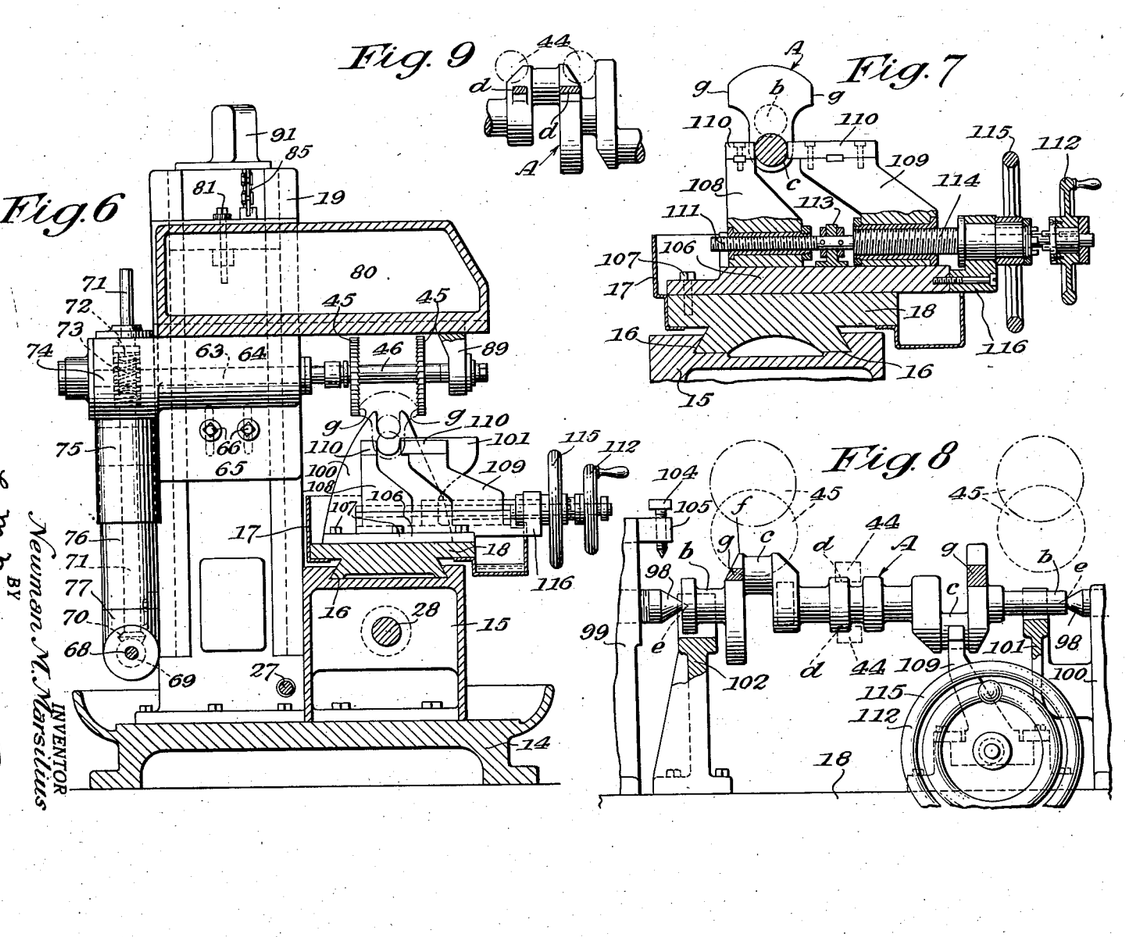
Fig. 6 shows a vertical cross section, see line 6, Fig. 1, through the horizontal reciprocatory work table, its bed, a crank shaft mounted on the table and illustrating the crank shaft chucking device and one of the horizontal spindles with cutters.
Fig. 7 shows a somewhat similar cross sectional view, on an enlarged scale, better to illustrate the chucks for the crank shaft and means for adjusting the chucks.
Fig. 8 illustrates a front view, on an enlarged scale, of an automobile motor crank shaft chucked for milling operations such as my machine is designed to perform.
Fig. 9 is the detail of the central portion of the crank shaft as shown in Fig. 8, better to illustrate the work of the side milling cutters shown in Figs. 1, 5, and 8.

An automobile engine crank shaft such as I have before referred to is shown in dotted lines in Fig. 1 and in full lines on a slightly enlarged scale in Figs. 8 and 9 and is designated as A. Rotary milling cutters such as I employ are shown in dotted lines in these figures and are positioned in relation to the several portions of the crank shaft illustrated. In this connection it will be observed that the milling operations are performed on the cheeks of the crank shaft rather than upon the ends or bearings. This obviously is due to the fact that the crank shaft is of a very irregular shape, making it difficult to finish the same when supported in end points or bearings, all of which has brought about the designing of my special machine, whereby the crank shaft is provided with suitable milled surfaces or engaging spots, preferably upon the cheek portions of the cranks or near the bearing, so that the same may be properly engaged at these places for milling or turning operations.

Figure 5:
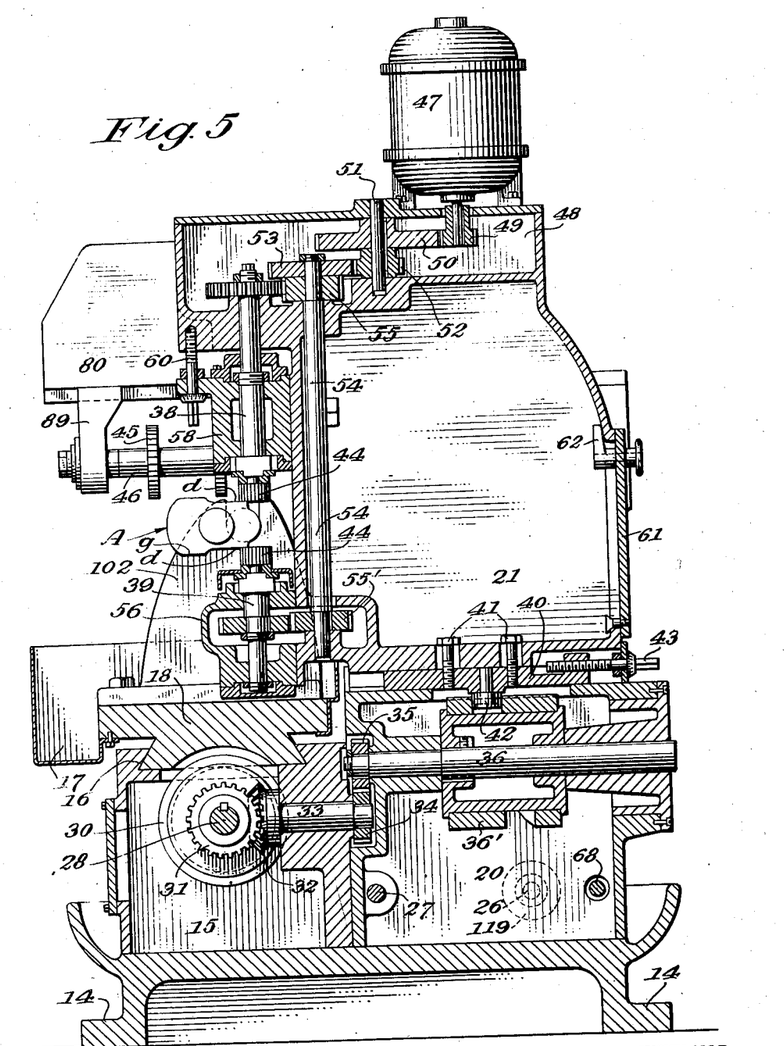
Fig. 5 is a vertical cross section on an enlarged scale, see line 5, Fig. 1, through the center of the machine showing the two vertically aligned cutter spindles with a piece of work positioned therebetween as in the act of being milled.

Referring again to Figs. 1 and 5 it will be seen that the rotary side cutters 44—44 mounted on the vertical spindles 38 and 39 perform horizontal cutting operations on opposite cheek portions d of the crank shaft, while the side milling cutters 45 on the horizontal spindles 46 perform somewhat similar cuts on other cheek portions of the crank shaft, see Fig. 6. The cutters 44—44 are obviously mounted on separate spindles driven from a common drive shaft, whereas the spaced apart cutters 45 on each of the horizontal shafts serve to straddle and mill opposite sides g—g of the crank shaft, see Fig. 6.

The cutters 45 and the spindles 46 are alike in construction, as are the separate mechanisms for operating the said cutters and spindles. These mechanisms are carried by the two columns 19—19 and since these columns and the parts carried thereby, including the cutters 45, are similar in design, I will use the same reference characters to designate the like parts of the two units. The columns carrying the units are secured to the base 14 in spaced relation one to the other and between them is positioned the intermediate bed 20 and its cross-slide 21 upon which a second motor 47 is mounted and employed for driving the vertical spindles 38 and 39, see Fig. 5. The driving spindle of this motor extends into a housing 48 of the cross slide 21 and carries a gear 49 that meshes with and drives a larger gear 50 carried upon a short shaft 51 journaled in bearings of the housing 48. This shaft 51 also carries a smaller gear 52 that meshes with a fourth gear 53 mounted upon the upper end of a relatively long shaft 54 that is journaled in bearings of the slide 21. These gears 49, 50, 52, and 53 obviously comprise speed changing gears whereby the speed of the motor is reduced for the spindles to the milling cutters. This shaft 54 also carries two additional gears 55 and 55' one for each of the cutter spindles. The lower cutter spindle 39 is mounted in a housing 56 that is adjustably mounted, see Fig. 1, in ways 57 on the front of the cross slide 21. The lower milling cutter 44 is mounted upon the upper end portion of this lower spindle 39 and, as will be seen, is in axial alignment with the upper spindle and the two serve to mill off the opposite cheeks d of the crank shaft A, see Figs. 5, 8, and 9. The upper cutter spindle 38 is also mounted in a housing 58 that is vertically adjustably mounted in axial alignment with the lower spindle on the front of the cross slide 21 by means of clamping screws 59 and a micrometer adjusting screw 60 whereby the distances between the two spaced apart cutters may be more accurately set to insure like milling operations upon successive crank shafts. 61 indicates a removable plate, having a turn button 62, which serves to close an opening in the rear of the cross slide, through which access is had to the interior of the same.

Referring to Fig. 6 is will be seen that the horizontal cutter arbors 46 before referred to are coupled to an aligned horizontal drive shaft 63, journaled in a cutter slide 64 provided with an adjusting plate 65, see Fig. 3, fitted to the column 19 by dovetail and gibs, and may be secured to the plate by means of screws 66. The drive shaft 26 is provided with gear connections 67 with a longitudinal shaft 68 that carries bevel gears 69, one for each cutter unit, that connects with a similar bevel gear 70 on a vertical shaft 71. A relatively long worm 72 is slidably splined upon each of these shafts 71 and meshes with and drives a worm gear 73 upon the cutter drive shaft 63, the said worm gears being inclosed within a housing 74 forming a part of the cutter slide 64 and adapted to move vertically with it. This housing includes a depending tubular casing 75 that is slidably connected to a similar tubular casing 76 secured to the lower gear housing 77 secured to the column by screws 78. These two casings form an inclosure for the shafts 71 and allow the cutter slide 64, its housing 74, its casing 75, shaft 63, and gear 73 to freely move up and down with respect to the shaft 71 by the action of the cam 95. An arm 80 is mounted upon each of these cutter slides and projects forward and over the crank shaft A to support the cutter spindles 46 and is dovetailed into the said cutter slide 64 for longitudinal adjustment. Screws 81 are employed to secure the slide in its adjusted position. As will be seen from Fig. 3 only the dovetailed underfaces of these extending arms 80 engage the slide, the sides of the arms being clear of the columns 19. Since the slide housings and arms are adjustably secured to the side of the column I provide a counterbalancing means for the same, see Fig. 3, comprising a spring 82 inclosed within a tubular casing 83 located within and secured to the column, that engages one end of a rod 84. A chain 85 that is guided over rollers 86 has one end connected to the said rod 84 and the other end to an adjustable connection 87 with a guide plate 65, see Fig. 3, that is adjustably connected to the cutter slide by means of screw bolts 88. The forward end of the arm 80 is provided with a hanger 89 that is clamped by a screw 90 and supports the forward end of the spindle 46 in alignment with the axis of the drive shaft that is connected with the inner end of the cutter spindles. The chain 85 and rollers are preferably inclosed by a housing 91.

The vertical feeding movement for the cutters 45, is obviously obtained by vertical movement of the arm 80 and its slide 64, the weight of which is counterbalanced by the before mentioned spring 82. The vertical movements of these cutters and slides are derived from the motor 24 through its gear housing 22 and the connected shaft 27, see Figs. 3 and 4. This shaft 27 extends through the base of the two columns 19—19 as well as the intermediate bed 20 and carries two worms 92—92, one for each pair of milling cutters 45 carried upon the spindles 46, therefore, one description for the parts driven from these worms will obviously answer for both, and which comprises a vertical cam shaft 94 that is journaled within the column and carries a cam 95, the groove of which receives and guides a roller 96 mounted upon a stud 97 secured in the dovetailed guide plate 65 to which the cutter slide 64 is connected.

The crank shaft A, see Figs. 1 and 8, is formed of a relatively heavy forging and is also of a very irregular shape, those for different motors being more or less different in design, but all these shafts include a central longitudinal axis which extends through aligned bearing portions which are designated as b—b. In the drawings c—c indicates the crank pins of the shaft to which in practice connecting rods are connected and d—d indicates cheeks. As applied to my machine, the crank shafts are provided with centering sockets e in each end which are adapted to be engaged by the centering points 98 of the head stock 99 and tail stock 100. The tail stock, see Figs. 1 and 8, is provided with a rest 101 to support one end of the crank shaft when loading the same in the machine, and a similar rest 102 is secured to the table 18 for supporting the other end of the crank shaft, see Figs. 6, 7, and 8. After the crank shaft A has been positioned on these rests 101 and 102, the hand wheel 103 and the points 98 of the tail stock are rotated to engage the tapering walls of the socket e until the crank shaft is raised from its supports, see Fig. 8, and centered with the axis of the centers of the head stock and tail stock. 104 indicates a centering pin which is carried upon a slide 105 mounted in the head stock for adjustment to register with a point f on the crank shaft for the purpose of positioning the same preparatory to the milling operations. This crank shaft, as will be seen, is mounted longitudinally upon the table which is adapted for reciprocatory movement, and together with the shaft is fed backward and forward during the milling operations of the several cutters.

In connection with the chucking of the crank shaft A I employ what I term an equalizer which is shown in Fig. 7 and being mounted upon the reciprocatory table 18 serves to finally position the crank shaft so that the cheeks and their crank pins are disposed radially with respect to the axis of the crank shaft, and at a proper angle to the other. This obviously insures the proper vertical and horizontal milling of the respective cheeks of the shaft. This equalizer, see Figs. 6, 7, and 8 comprises a plate 106 that is secured to the table by means of screws 107 and is provided with ways in which adjustable jaws 108 and 109 are mounted. Each of these jaws are provided with a plate 110 for engagement with opposite sides of one of the crank pins c of the crank shaft to adjust it forward or backward as may be necessary to insure its desired positioning. An adjusting screw 111 having right hand threads engages the jaw 108 and is adapted to be operated by the hand wheel 112. This adjusting screw is provided with an intermediate bearing 113 mounted upon the bed plate 106. The jaw 109 is also provided with an adjusting screw 114 having left-hand threads, which is tubular in form inclosing in part the screw 111 which freely extends therethrough. A hand wheel 115 is mounted upon the screw 114 whereby the latter may be turned to move the jaw 109 forward or backward. A suitable bearing 116 is attached to the side of the bed plate 106 and serves as a support for the two said adjusting screws and their wheels. This means it will be apparent that this equalizer will serve to provide the final adjustment for the proper positioning of the crank shaft preparatory to the milling operations.

Referring more particularly to Figs. 6, 8 and 9, it will be seen that the milling cutters 45 mounted upon the two horizontal spindles 46 carried by the slides 80 serve to mill off the opposite cheeks g—g of such portions of the crank shaft as may be necessary while the end cutters on the aligned vertical spindles simultaneously operate on the cheeks d—d see Figs. 8 and 9, of intermediate portions of the crank shaft. The first mentioned cutters 45 in addition to their rotary movement and in addition to the movement of the crank shaft by reason of their being mounted on a vertically movable slide, provide a vertical feeding movement in addition to the horizontal feeding movement of the table and the work upon which the cutters 45 operate. The cutters 45 after being properly adjusted for the particular finished dimensions of the work to be operated upon have only horizontal feeding movements which are brought about through the operation of the table 18 and cam 30 on the shaft 36. The several milling cutters referred to all obviously operate simultaneously and in timed relation with the movement of the table and the work so that it is possible to perform the several milling operations required, on the crank shafts, for chucking in finishing machines, very quickly, in less time, in fact, than it requires to remove the milled piece and the loading of the next piece to be operated upon.

Figure 10:
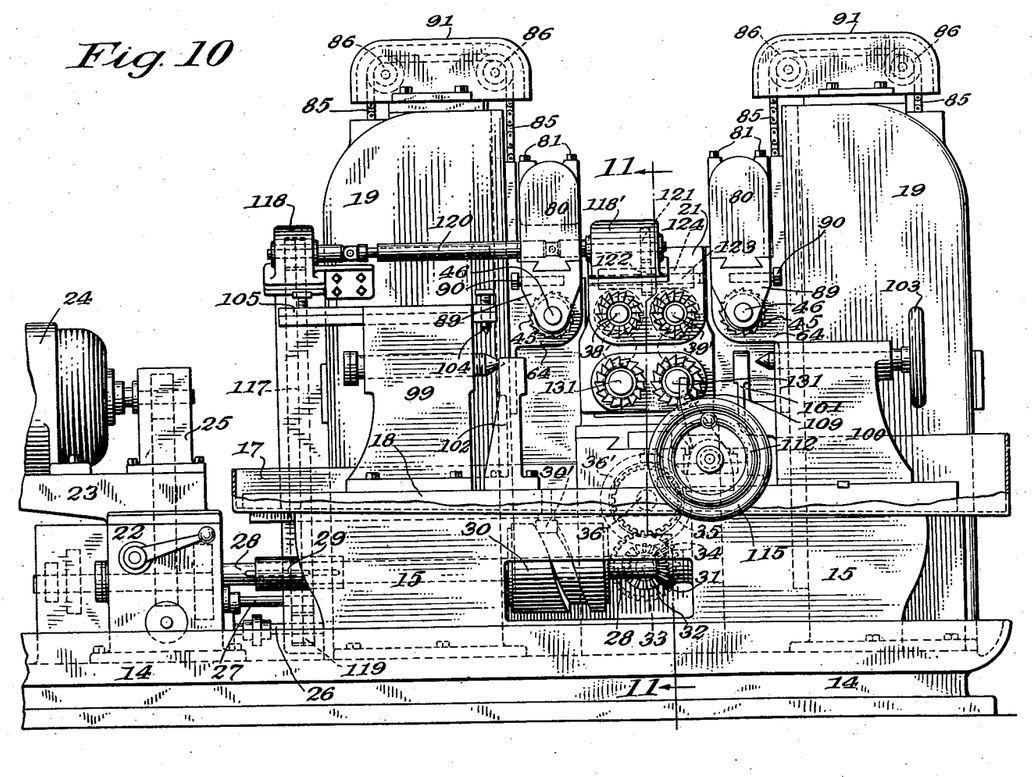
Fig. 10 shows a front elevation, somewhat like Fig. 1, of a modified form of my improved crank shaft milling machine wherein the intermediate side millers are arranged to operate on the rear side of the crank shaft.
Figure 11:
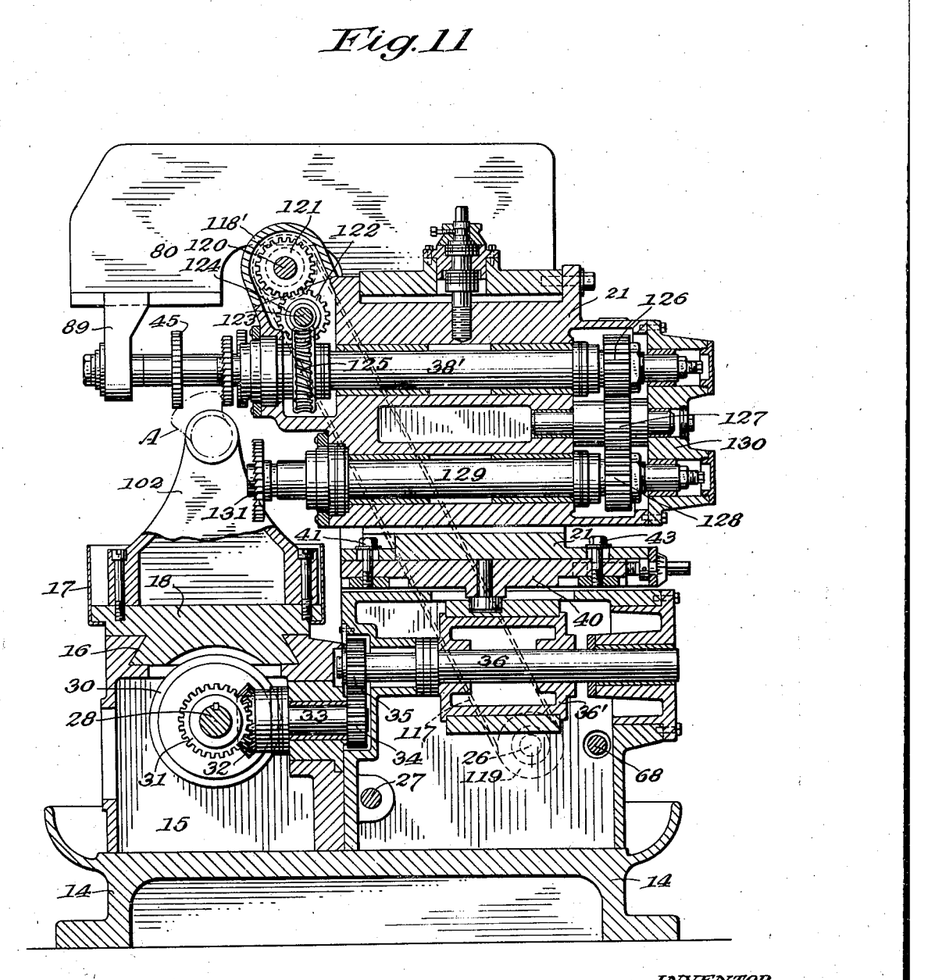
Fig. 11 shows a central vertical cross section, somewhat like Fig. 5, though taken on line 11—11 of Fig. 10 illustrating the modified structure.

Referring to the modified form of the invention shown in Figs. 10 and 11, it will be noted that the work table 18 and parts carried thereby are similar to that shown in the other form and is operated from the shaft 28 and through the cam 30. This modified form of structure further includes shaft 33, gears 34 and 35 which drive the shaft 36 and its cam 36'. This cam in turn operates the cross slide 21. The milling cutters and shafts in this instance are driven from the shaft 26 thus eliminating the use of the motor 47. The cross slide which carries the end millers is likewise provided with screws 41 and 43 for adjusting the position of the slide with respect to the plate 49.

A belt 117 connects a pulley 119 on the shaft 26 with a pulley mounted upon a flexible shaft 120 one member of which is journaled in bearings 118 on the front of one of the columns 19, while the other portion is journaled in a sleeved bearing 118' in the cross slide 21. This shaft in turn carries a gear 121 that meshes with a gear 122 on a short shaft 123, which also carries a relatively long worm 124 that meshes with and drives a worm gear 125 upon each of the two upper shafts 38' and 39'. Each of these upper shafts carry a gear 126 upon its rear end portion, which gears in turn mesh with and drive an idler gear 127 that meshes with and drives the gear 128 on the rear end portion of each of the two lower shafts 129. Suitable bearings are obviously provided for these gears and the rear end portion is inclosed by a housing 130. This line of drive therefore provides rotary movement for the four cutter spindles 38'—38' and 129—129 and the side cutters 131 which are suitably mounted upon the forward end portion of each of these shafts and adapted to be adjusted to provide required alignment for operating upon the sides of certain portions of the crank shaft. The two upper cutters obviously serve to perform spaced apart operations on the upper portion of the rear side of the crank shaft while the lower pair of cutters serve to perform similar operations on the lower portion of the rear side of the same crank shaft. This means provision is made for performing two extra cutting operations on the crank shaft which is desirable in some instances especially where longer and heavier crank shafts are to be operated upon. In each instance, of course, the crank shafts have got to be in proper alignment and otherwise set absolutely accurate to provide the necessary milling or spotting operations were required. The sum total of the result of the modified construction is that four intermediate side millers are provided all of which operate against the rear side of the crank shaft, rather than two millers, that work against the top and bottom, or opposite sides, of the crank shaft.

Having thus described my invention, what I claim and desire to secure by Letters Patent is:

1. In a milling machine of the class described, a bed, a reciprocatory work table mounted upon the bed, a second bed disposed at a right angle to the first mentioned bed, a slide mounted on the second bed, a head stock and tail stock mounted on the table, cam means for imparting reciprocatory movement to the table and to the said slide, spaced apart vertically aligned cutter arbors carried by the slide, a bearing housing for each of the said cutter arbors, means for adjustably securing said housings to the front of the slide, end cutters carried by each of the adjacent ends of the two said cutter arbors for performing aligned milling operations on opposite sides of a piece of work, a common shaft connected to simultaneously drive the two said cutter arbors and a motor carried by the slide for operating said common shaft.

2. In a milling machine of the class described, the combination of spaced apart vertically movable slides, a slide intermediate the vertical movable slides, means for reciprocating said slides, cutter arbors and cutters carried by said slides, means for operating the arbors and cutters, a reciprocatory work table, cam means for imparting reciprocatory movement to the table and to the said intermediate slide, spaced apart vertically aligned cutter arbors carried by the intermediate slide, a bearing housing for each of the said cutter arbors, means for adjustably securing said housing to the intermediate slide, a cutter carried by each of the adjacent ends of the two said cutter arbors adapted to perform aligned milling operations on opposite sides of a piece of work, the three said milling units being operatably connected for simultaneously performing operations on spaced apart portions of an elongated work piece mounted upon the table.

3. A milling machine of the class described, including a base, spaced apart columns mounted thereon presenting two adjacent faces, a bed positioned on the base at the front side of each column, an intermediate bed mounted on the base between said columns, a reciprocatory work table mounted upon the first mentioned bed, a slide mounted on the adjacent sides of each of the two columns, means for reciprocating the two slides, a cutter arbor journaled in each of said two slides, vertically disposed intermediate shafts geared to operate the cutter arbors, a common drive shaft having separate gear connections for the two said connecting shafts for similarly operating the two said arbors, an intermediate slide mounted on the intermediate bed, means for reciprocating the last mentioned slide, cutter arbors and cutters carried by the intermediate slide, means for operating the last mentioned arbors.

4. A milling machine of the class described, including a base, spaced apart columns mounted thereon, a table bed, an intermediate bed mounted on the base between the said columns, a reciprocatory work table mounted upon the table bed, a vertically movable slide mounted on each of the two columns, means for operating the two slides, cutter arbors carried by said slides, a slide mounted for reciprocatory movement on the intermediate bed and at a right angle to the movement of said work table, a cam and cam shaft for reciprocating the table, a cam and cam shaft for operating the intermediate slide, gears connecting the two said cam shafts, vertically disposed cutter arbors and cutters carried by the vertically movable slides, means for operating the last mentioned arbors disposed vertically and at an angle to the first mentioned arbors.

5. A milling machine including three spaced apart milling units two of which include horizontally positioned cutter carrying arbors, the third being positioned intermediate the above mentioned two units and having spaced apart aligned cutter arbors arranged at a different angle from that of the first mentioned cutter arbors and including end cutters for operating upon opposite sides of a work piece, a horizontal reciprocatory work carrying table adapted for supporting work in alignment with said milling units, said milling units being reciprocatively mounted for feeding the cutters to and from a work piece when secured upon the table, cam means for lowering and raising the horizontal arbors and their cutters for milling operations, means for counterbalancing the weight of said spindles and their associated parts, means for driving the two said horizontal spindles through the worm and gear connections from the common drive shaft and means for providing feeding movements to the aligned driving spindles.

6. A milling machine of the class described, including a base, spaced apart columns mounted thereon, a table bed, an intermediate bed mounted on the base between the said columns, a reciprocatory work table mounted upon the first mentioned bed, a vertically movable cutter slide mounted on the face of each of the two columns, a common drive means for reciprocating the two slides, a cutter arbor journaled in each of said slides, a common drive shaft having separate gear connections for the two said connecting shafts for similarly operating the two said arbors, a telescopic casing inclosing the said intermediate shafts, a slide mounted on the intermediate bed, means for reciprocating the last mentioned slide, two aligned cutter arbors and cutters carried by the vertically movable slides, a common drive means for operating the two vertical arbors and cutters.

7. A milling machine of the class described, including a base, spaced apart columns mounted thereon, a bed positioned at the side of the columns, an intermediate bed mounted upon the base between the said columns, a reciprocatory work table mounted upon the first mentioned bed, a vertically movable slide mounted on each of the two columns, means for operating the two slides, an arbor and cutters mounted in each of the two vertical movable slides for operations upon the end portions of a work piece, when mounted on the table, means for operating said arbors and cutters, a third slide on the intermediate bed, side millers positioned upon said third slide for milling intermediate portions of the work piece, means for operating the last mentioned millers, the three said cutter units being connected for operations on spaced apart portions of an elongated work piece when mounted upon the reciprocatory table.

8. A milling machine of the class described, including a base, columns mounted thereon presenting two adjacent faces, a bed mounted upon the base at the front of the column, a reciprocatory work table mounted upon the first mentioned bed, a head stock and tail stock mounted on the work table, a slide mounted on the adjacent sides of each of the columns, cutter arbors and cutters carried by the last mentioned slides, means for reciprocating the two said slides, a slide mounted on the intermediate bed, means for reciprocating the intermediate slide, cutter arbors and cutters carried by the intermediate slide, means for operating the last mentioned arbors disposed at an angle with respect to the first mentioned arbors, the three said cutter units being connected for operations on spaced apart portions of an elongated work piece when carried on the reciprocatory table.

9. A milling machine of the class described, including a base, spaced apart columns mounted thereon presenting two adjacent faces, a bed positioned on the base at the front of the columns, an intermediate bed mounted upon the base between said columns, a reciprocatory work table mounted upon the first mentioned bed, a vertically movable cutter slide mounted on the adjacent sides of each of the two columns, cutter arbors and cutters carried by the last mentioned slides, means for operating the two said slides, a third slide on the intermediate bed, cam means for imparting reciprocatory movement to the last mentioned slide, vertically aligned cutter arbors journaled in the last mentioned slide at a right angle to the first mentioned arbors, means for adjusting said arbors and cutters with respect to each other, means for operating the vertically aligned arbors, the three said cutter units being connected for simultaneous operations on spaced apart portions of an elongated work piece when mounted upon the reciprocatory table.

10. A milling machine of the class described, including a base, spaced apart columns mounted thereon presenting two adjacent faces, a bed positioned on the base adjacent the columns, an intermediate bed mounted upon the base between said columns, a reciprocatory work table mounted upon the first mentioned bed, a vertically movable slide mounted on the adjacent sides of each of the two columns, means for operating the two said slides, a slide mounted on the intermediate bed, means for reciprocating the last mentioned slide at a right angle to the first mentioned slides, cutter arbors and cutters carried by each of said slides, means for operating each of the arbors, the three said cutter units being connected for simultaneous operations on spaced apart portions of an elongated work piece when mounted upon the reciprocatory table.

11. A milling machine of the class described, including a base, spaced apart columns mounted thereon presenting two adjacent faces, a bed positioned on the base adjacent the columns, an intermediate bed mounted upon the base between the said columns, a reciprocatory work table mounted upon the first mentioned bed, a cutter slide mounted on each of the adjacent sides of the two said columns, cam shafts and cams for vertically moving the two said cutter slides, a drive shaft, separate gear connections from the drive shaft to the cam shafts for similarly operating the same and their slides, an intermediate slide, mounted on the intermediate bed, means for reciprocating the intermediate slide, cutter arbors and cutters carried by the intermediate slide, at a right angle to the first mentioned cutter slides, means for operating the last mentioned cutter arbors, the three said cutter units being connected for simultaneous operations on spaced apart portions of an elongated work piece when mounted upon the reciprocatory table.

NEWMAN M. MARSILIUS.